(12) United States Patent
Abe et al.

(10) Patent No.: US 6,600,857 B1
(45) Date of Patent: Jul. 29, 2003

(54) GRATING OPTICAL FIBER, AND OPTICAL FIBER BASE MATERIAL SUITABLE FOR GRATING

(75) Inventors: Jun Abe, Annaka (JP); Masayasu Nagaoka, Annaka (JP); Nobuyasu Mantoku, Annaka (JP); Kazuo Koya, Annaka (JP)

(73) Assignee: Shin-Etsu Chemical Co., LTD, Tokyo (JP)

( * ) Notice: Subject to any disclaimer, the term of this patent is extended or adjusted under 35 U.S.C. 154(b) by 0 days.

(21) Appl. No.: 09/604,302

(22) Filed: Jun. 26, 2000

Related U.S. Application Data

(62) Division of application No. 09/253,724, filed on Feb. 22, 1999, now Pat. No. 6,157,758.

(30) Foreign Application Priority Data

Feb. 20, 1998 (JP) .............................................. 10-38460

(51) Int. Cl.$^7$ .................................................. G02B 6/34
(52) U.S. Cl. .......................................... 385/37; 64/385
(58) Field of Search ........................ 65/385, 421, 422, 65/398, 427; 385/14, 129, 132, 147, 901, 37, 123, 124; 428/366, 375, 379, 384; 427/163.2, 249.3, 249.5, 255.7

(56) References Cited

U.S. PATENT DOCUMENTS

| | | | | |
|---|---|---|---|---|
| 4,735,856 A | * | 4/1988 | Schultz et al. | 428/366 |
| 4,740,951 A | * | 4/1988 | Lizet et al. | 370/3 |
| 5,210,801 A | * | 5/1993 | Fournier et al. | 385/14 |
| 5,757,540 A | | 5/1998 | Judkins et al. | |
| 5,802,235 A | * | 9/1998 | Akasaka | 385/124 |
| 6,009,222 A | * | 12/1999 | Dong et al. | 385/127 |
| 6,067,392 A | | 5/2000 | Wakami et al. | |
| 6,189,342 B1 | * | 2/2001 | Berkey | 65/412 |
| 6,221,555 B1 | * | 4/2001 | Murakami et al. | 430/270.1 |

FOREIGN PATENT DOCUMENTS

JP   40920381 A   *  8/1997   .................. 385/37

\* cited by examiner

Primary Examiner—Akm Enayet Ullah
(74) Attorney, Agent, or Firm—Pillsbury Winthrop LLP

(57) ABSTRACT

A grating optical fiber comprises a core, a first clad layer formed around the core, and a second clad layer formed around the first clad. Germanium is doped in the core, while germanium and fluorine are doped in the first clad layer. Gratings are formed on both the core and the first clad layer. The difference between the indexes of refraction between the first and second clad layers is smaller than the difference between the indexes of refraction between the core and the first clad layer.

5 Claims, 9 Drawing Sheets

GRATING OPTICAL FIBER, AND OPTICAL FIBER BASE MATERIAL SUITABLE FOR GRATING

CROSS REFERENCE TO RELATED APPLICATIONS

This is a divisional application of U.S. patent application Ser. No. 09/253,724, filed Feb. 22, 1999, which claims priority to Japanese Patent Application No. H10-38460, filed Feb. 20, 1998.

BACKGROUND OF THE INVENTION

1. Field of the Invention

This invention relates to a grating optical fiber, an optical fiber base material suitable for grating, and method for manufacturing the grating optical fiber.

2. Description of the Related Art

Zero-dispersion fibers (SMF) for a wavelength of 1.3 $\mu$m and zero-dispersion fibers (DSF) for a wavelength of 1.55 $\mu$m are widely used as transfer optical fibers. If a periodic change (such as a diffraction grating) is provided to the transfer optical fiber, reflection or optical coupling occurs with respect to a specific wavelength. Based on this fact, many studies and researches for forming a grating on an optical fiber in order to extract a specific wavelength have been made.

If the optical fiber is irradiated by ultra-violet rays via a mask having a transparent pattern, the index of refraction of the irradiated portion differs from that of the blocked portion of the optical fiber. By making use of this phenomenon, a grating can be written on the optical fiber. In particular, if the germanium doped in the quartz glass of the optical fiber is irradiated by ultra-violet rays, the lattice defect increases, and therefore, the index of refraction of the portion exposed to the ultra-violet rays increases. Since gratings can be written only in the areas in which germanium is doped, a grating can be formed on the core, which contains doped germanium, when the optical fiber is irradiated by ultra-violet rays.

FIG. 1 is a cross-sectional view of a conventional grating optical fiber taken along the longitudinal axis. This figure also shows the grating writing area 56 and the light propagation range 55. As shown in FIG. 1, light propagates not only through the core, but it slightly spreads out of the core into the clad 54. Even if the optical fiber has a grating on the core which has the filter effect for reflecting a certain light component having a specific wavelength, the filter property is likely to deteriorate because of the leakage of the light into the clad 54.

SUMMARY OF THE INVENTION

Therefore, it is an object of the invention to overcome the above-described drawback in the prior art, and to provide a grating optical fiber and an optical fiber base material suitable for grating which has a superior filtering ability.

In order to achieve the object, in one aspect of the invention, a grating optical fiber comprises a core, a first clad layer surrounding the core, and a second clad layer surrounding the first clad layer, and gratings are formed in both the core and the first clad layer.

Germanium is doped in the core, while germanium and fluorine are doped in the first clad layer.

Preferably, the difference between the specific indexes of refraction of the first and second clad layers is smaller than the difference between the specific indexes of refraction of the core and the first clad layer.

Preferably, the ratio of the outer diameter of the core to the outer diameter of the first clad is about 1:2 to 1:6.

In another aspect of the invention, an optical fiber base material suitable for grating is provided. The optical fiber base material comprising a core material which forms the core of an optical fiber, a first clad layer surrounding the core material, a second clad surrounding the first clad. Germanium is doped in the core material, and germanium and fluorine are doped in the first clad layer.

In still another aspect of the invention, a method for manufacturing an optical fiber base material which is used as a base material of an optical fiber, is provided. This method comprises the steps of preparing a core in which germanium is doped; forming a first clad layer, in which germanium and fluorine are doped, around the core; and forming a second clad layer around the first clad layer.

The first clad layer is formed by preparing a quartz axis; depositing silica soot, in which germanium is doped, on the quartz axis to form a silica soot layer around the quartz axis; removing the quartz axis from the silica soot layer; sintering the silica soot layer in the fluorine atmosphere to form a sintering glass shell; etching and polishing the sintering glass shell to form a polished glass shell; and inserting the core into the polished glass shell.

The second clad layer is formed by preparing a quartz axis; depositing silica soot on the quartz axis to form a second silica soot layer; removing the quartz axis from the second silica soot layer; sintering the silica soot layer in the fluorine atmosphere to form a second sintering glass shell; etching and polishing the sintering glass shell to form a second polished glass shell; and inserting the first clad layer into the polished glass shell.

Alternatively, the first clad layer may be formed by preparing a plurality of first clad sticks in which germanium is doped; and bundling the plurality of first clad sticks around the core to form the first clad base. In this case, the second clad layer is formed by forming a tube-like second clad layer shell; inserting the first clad base into the second clad layer; and jacketing the first clad base and the second clad layer into a single unit.

Preferably, the maximum number of the first clad sticks that can be inserted in the second clad layer shell are inserted in the second clad layer shell so as to surround the core inside the second clad layer shell.

In still another aspect of the invention, a method for fabricating a grating optical fiber from an optical fiber base material is provided. Such an optical fiber base material comprises a core in which germanium is doped, a first clad layer in which germanium and fluorine are doped, the first clad layer being formed around the core, and a second clad layer formed around the first clad layer. This method comprises the steps of wiredrawing the optical fiber base material to form an optical fiber; and irradiating the optical fiber to ultraviolet rays to write gratings on the core and the first clad layer.

BRIEF DESCRIPTION OF THE DRAWINGS

The above and other objects and features of the invention will become more apparent from the following detailed description of the preferred embodiments with reference to the attached drawings, wherein.

DETAILED DESCRIPTION OF THE PREFERRED EMBODIMENTS

Figure 1:
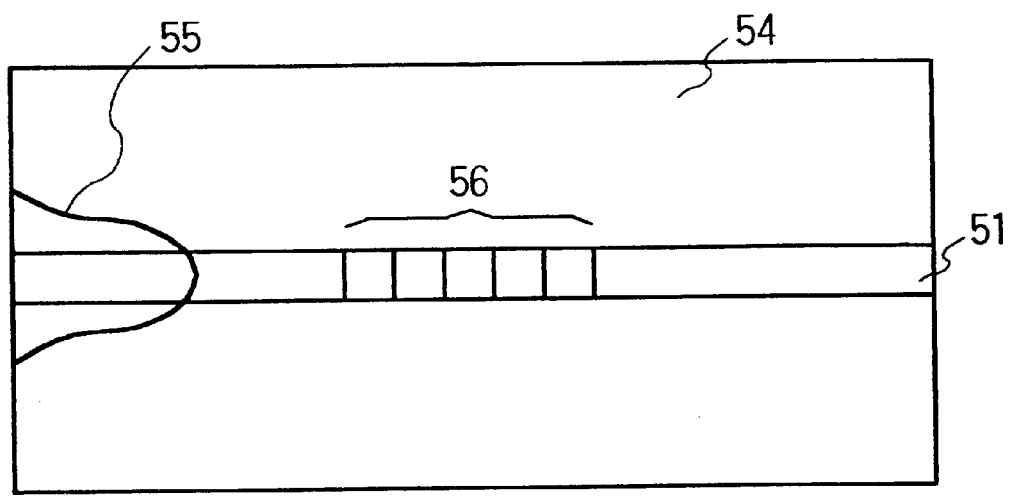
FIG. 1 is a cross-sectional view of a conventional grating optical fiber taken along the longitudinal axis, showing the grating writing area and the light propagation range.
Figure 2:
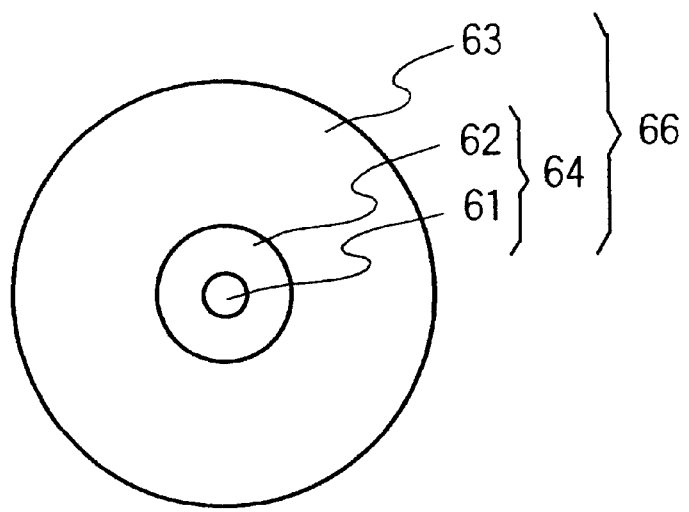
FIG. 2 is a radial cross-sectional view of the optical fiber base material suitable for grating according to the invention.

FIG. 2 is a cross-sectional view in the radial direction of the optical fiber base material 66 suitable for grating according to the invention. The optical fiber base material 66 comprises a core 61, a first clad layer 62 formed around of core 61, and a first clad layer 63. Germanium is doped in the core 61, while germanium and fluorine are doped in the first clad layer 62. The core 61 and the first clad layer 62 comprise a first clad base 64

Preferably, the difference between the specific index of refraction of the second clad layer 63 and that of the second clad layer 63 is smaller than the difference between the specific index of refraction of the core 61 and that of the first clad layer 62. The preferred range of the ratio of the outer diameter of the core 61 to the outer diameter of the first clad layer 62 is 1:2 to 1:6.

Figure 3:
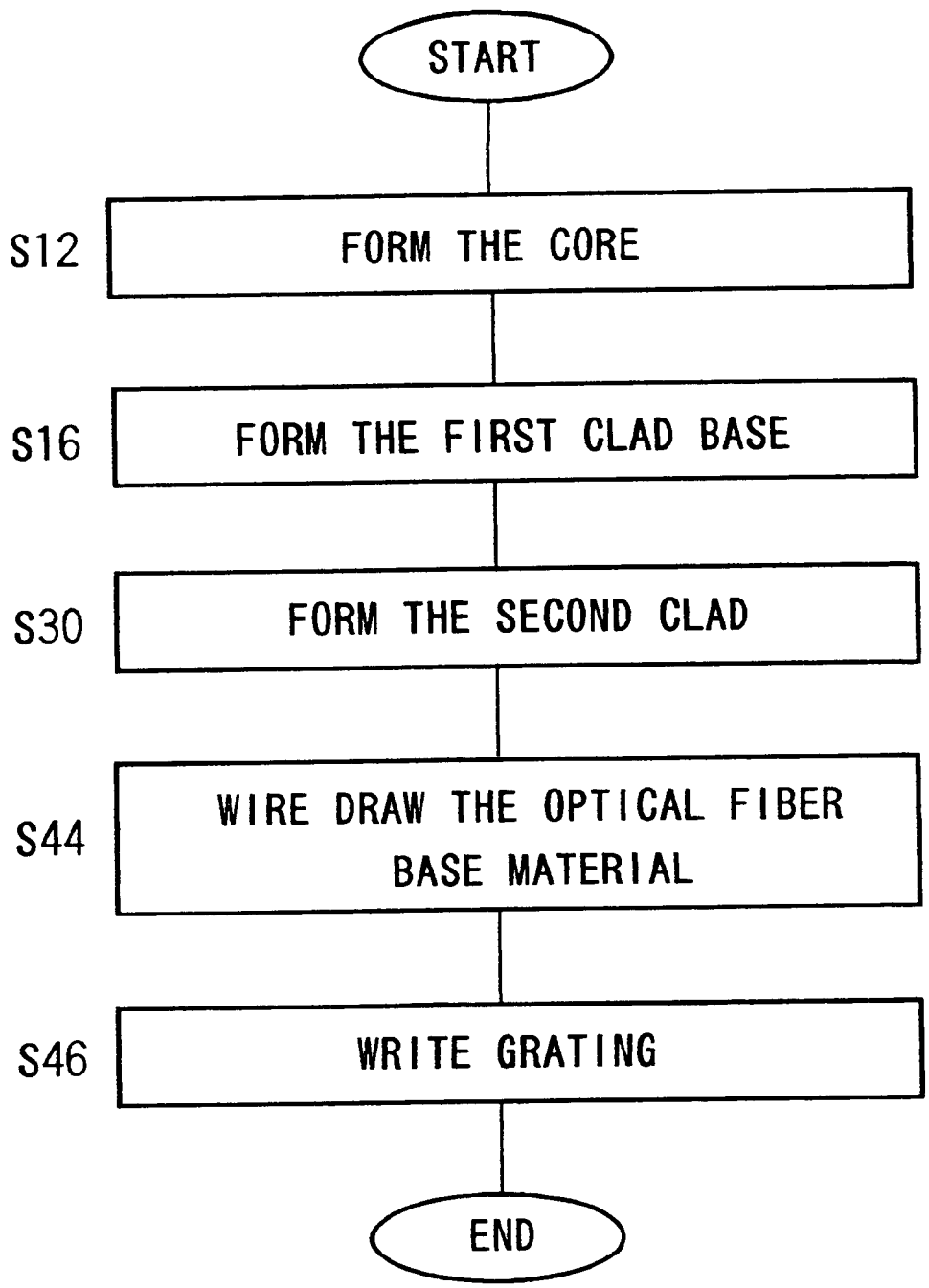
FIG. 3 is a flowchart of the manufacturing process for the grating optical fiber according to the invention.

FIG. 3 is a flowchart of the manufacturing process of a grating optical fiber using the optical fiber base material 66 shown in FIG. 2. First, a core 61 in which germanium is doped is prepared in S12. Then, the first clad layer 62, in which germanium and fluorine are doped, is formed around the core 61 to produce a first clad base 64 (S16). The second clad layer 63 is formed around the first clad base 64 (S30). The optical fiber base material is subjected to the wiredrawing process, whereby an optical fiber is produced (S44). Finally, the optical fiber is irradiated by ultraviolet rays to write a grating on the core 61 and the first clad layer 62 (S46).

In S12, the core 61 may be formed by a vapor-phase axial deposition (VAD) method, an outside vapor deposition (OVD) method, or a modify chemical vapor deposition (MCVD) method.

Figure 4:
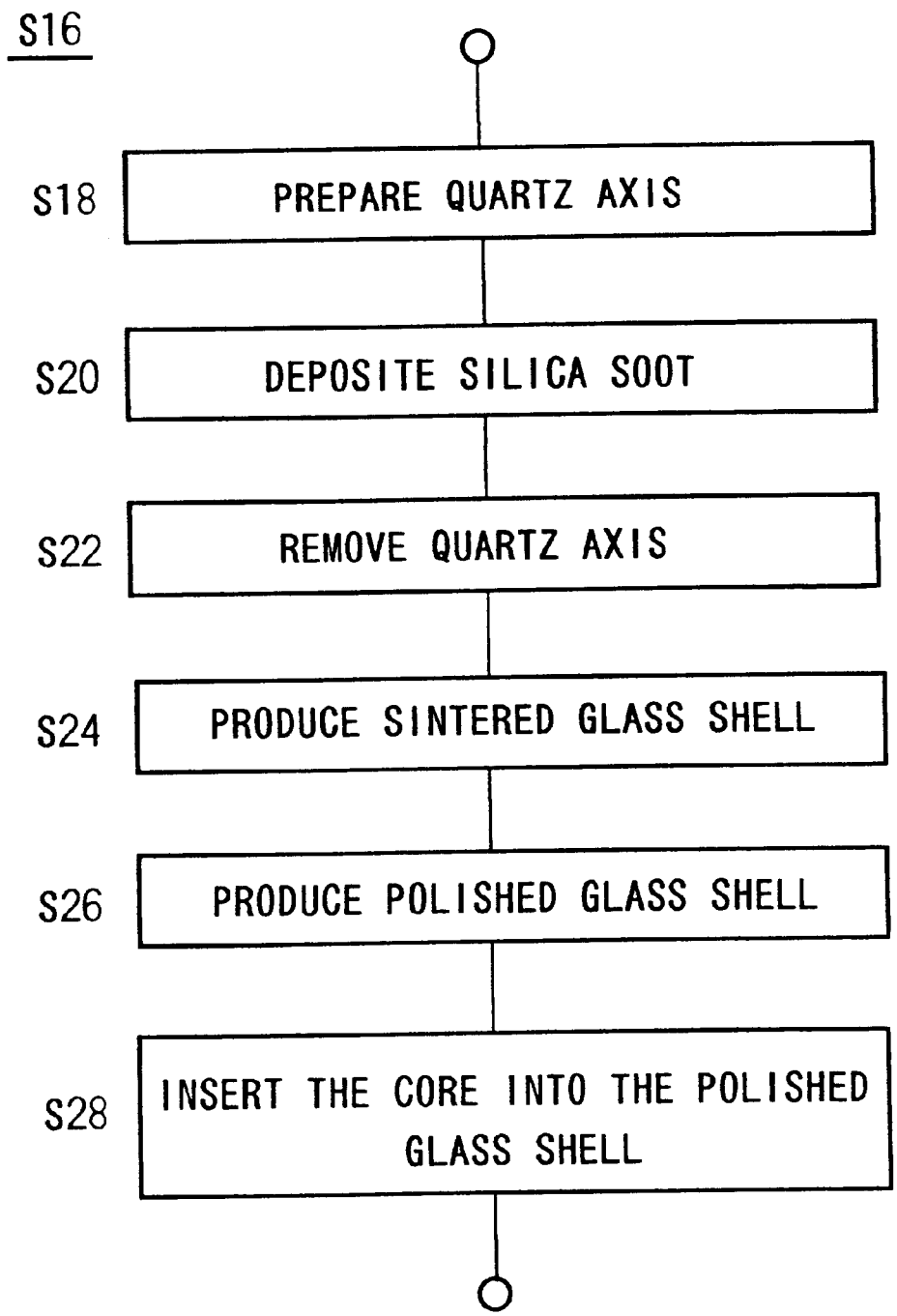
FIG. 4 is a flowchart of the manufacturing process for the first clad layer.

FIG. 4 is a flowchart showing the detailed steps of the formation of the first clad base 64 (S16 in FIG. 3). The first clad layer 62 may be formed around the core 61 by either the vapor-phase axial deposition (VAD) method or the outside vapor deposition (OVD) method. In the flowchart of FIG. 4, the OVD method is used. First, a quartz axis is prepared (S18). Then, silica soot, in which a desired amount of germanium is doped, is deposited on the quartz axis (S20). After the deposition, the quartz axis is removed from the silica soot layer (S22). Then, the silica soot layer is sintered in the fluorine atmosphere at a desired concentration to form a sintering glass shell (S24). This sintering glass shell is etched and polished to produce a polished glass shell (S26). Finally, the core 61 is inserted in the glass shell in S28. The core 61 and the glass shell (i.e., the first clad layer 62) are jacketed together into a single unit, and the first clad base 64 is completed.

It is preferable to use the OVD method because the vapor-phase axial deposition may causes the distribution (or the concentration) of the germanium in the silica soot to be uneven during the deposition. The amount of germanium doped in the silica soot is preferably the same or similar to that in the core 61.

Figure 5:
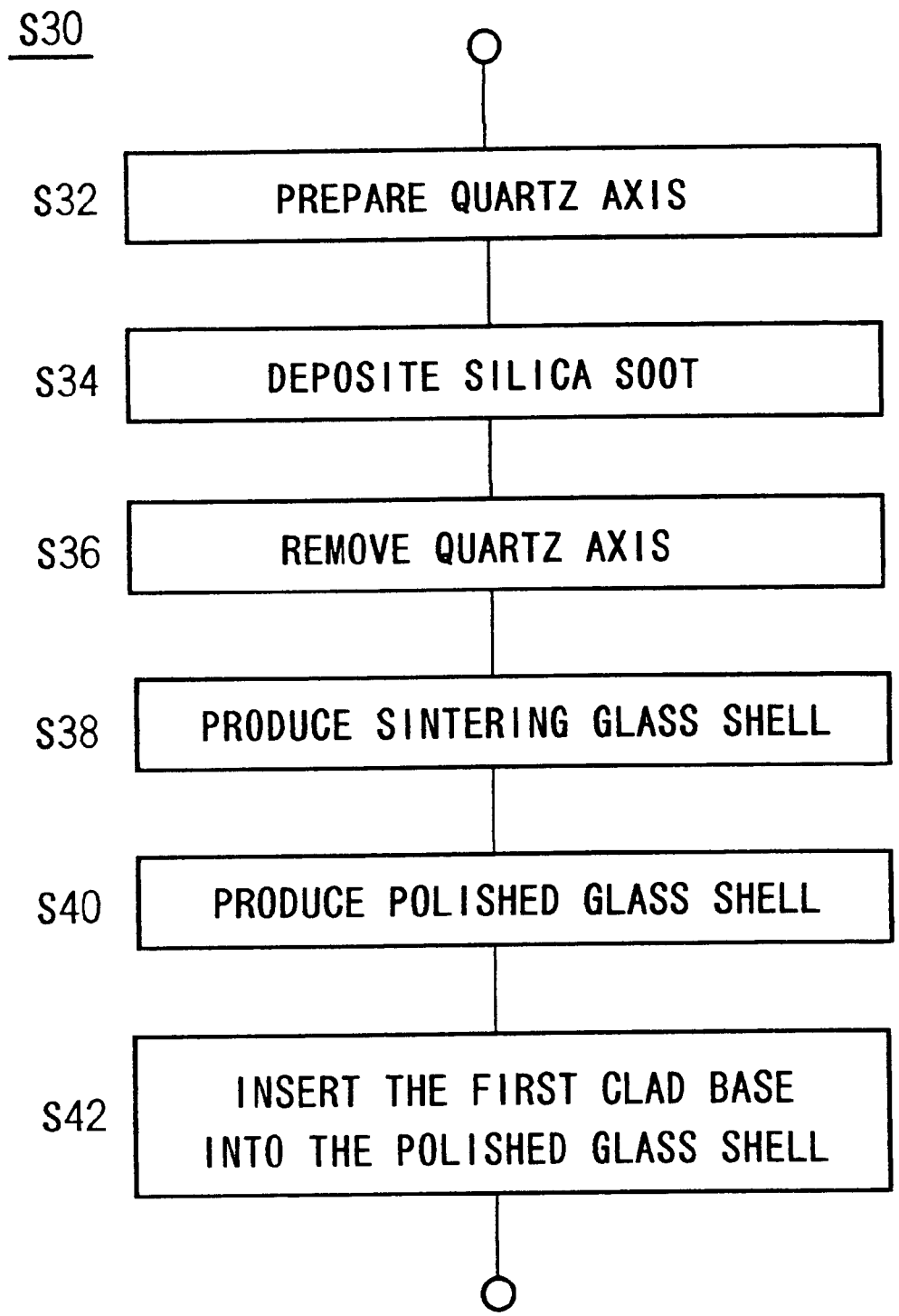
FIG. 5 is a flowchart of the manufacturing process for the second clad layer.

FIG. 5 is a flowchart showing the detailed steps of the formation of the second clad layer 63 (S30 shown in FIG. 3). The second clad layer 63 may be formed by an outside vapor deposition (OVD) method or a jacketing method. First, a quartz axis is prepared (S32). Silica soot is deposited on the quartz axis (S34). After the deposition, the quartz axis is removed from the silica layer (S36). The silica layer is sintered to form a sintering glass shell (S38). The sintering glass shell is etched and polished to form a polished glass shell 63 (S40). The first clad base 64 formed in the process shown in FIG. 4 is inserted in the polished glass shell (i.e., the second clad layer) 63 (S42).

Figure 6:
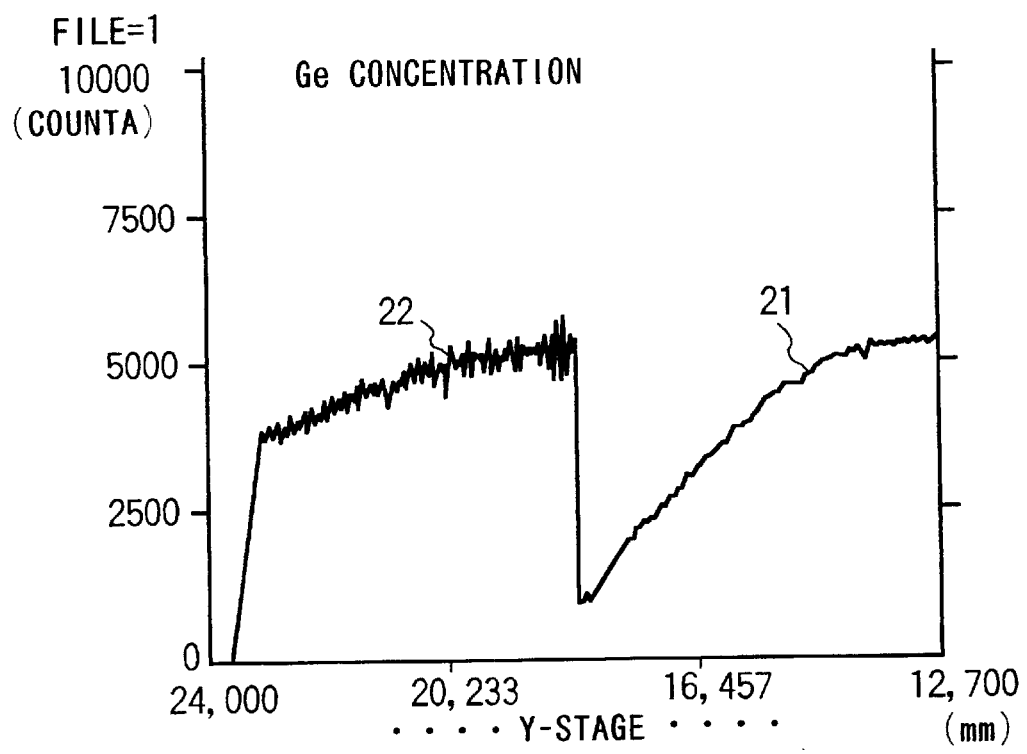
FIG. 6 illustrates the distribution of germanium in the radial direction of the optical fiber base material measured by an EPMA.

FIG. 6 shows the results of the EPMA analysis of the germanium doped in the first clad base. The curve 21 indicates the amount of germanium in the core 61, and the saw-tooth line 22 indicates the amount of germanium doped in the first clad layer 62. The final count of the germanium is almost the same in the core 61 and the first clad layer 62. Thus, the doping amount in the core 61 is almost the same as that in the first clad layer 62. The silica soot layer (i.e., the first clad layer) containing germanium is sintered in the fluorine atmosphere until the difference between the specific index of refraction of the first clad layer 62 and that of the second clad layer 63 approaches zero. The sintering temperature is, for example, 1480° C., and the concentration of the fluorine is 1.0 litter per minute. It is preferable for the germanium and fluorine to be uniformly distributed in the glass shell (i.e., the first clad layer) 62.

Figure 7:
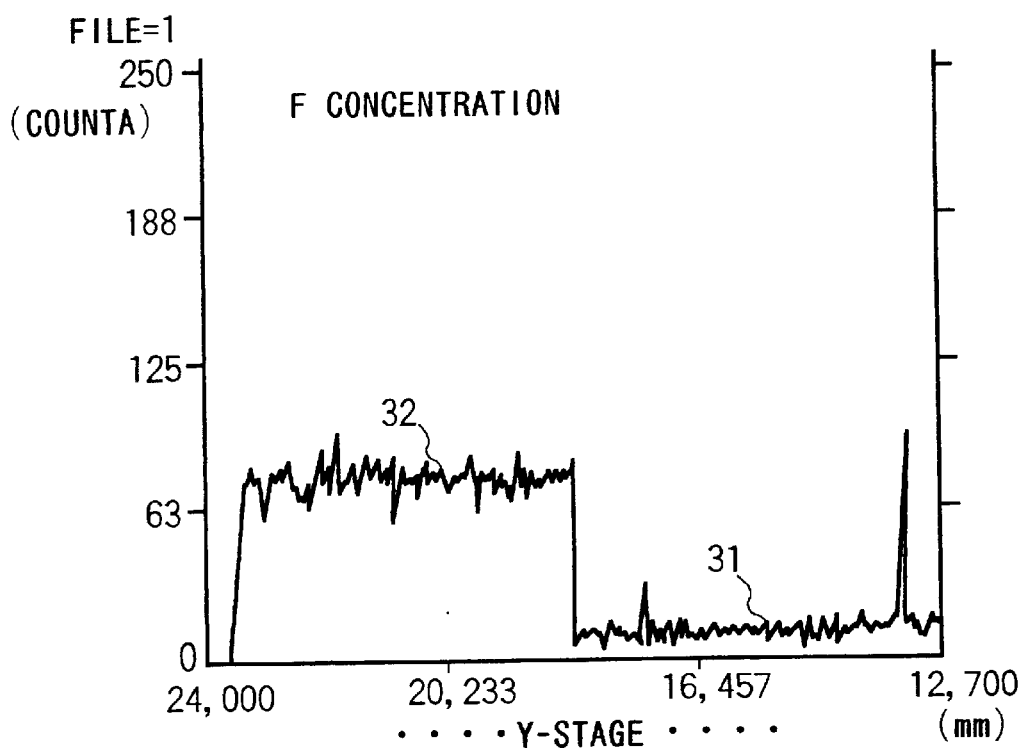
FIG. 7 illustrates the distribution of fluorine in the radial direction of the optical fiber base material measured by an EPMA.

FIG. 7 illustrates the results of the EPMA analysis of the fluorine, which shows the amount of fluorine contained in the first clad base 64. The saw-tooth line 31 indicates the amount of fluorine in the core 61, and the saw-tooth line 32 indicates the amount of fluorine doped in the first clad layer 62. Because the first clad layer (i.e., silica soot) 62 is deposited in the fluorine atmosphere, the concentration of fluorine in the first clad layer 62 is much higher than that in the core 61.

Figure 8:
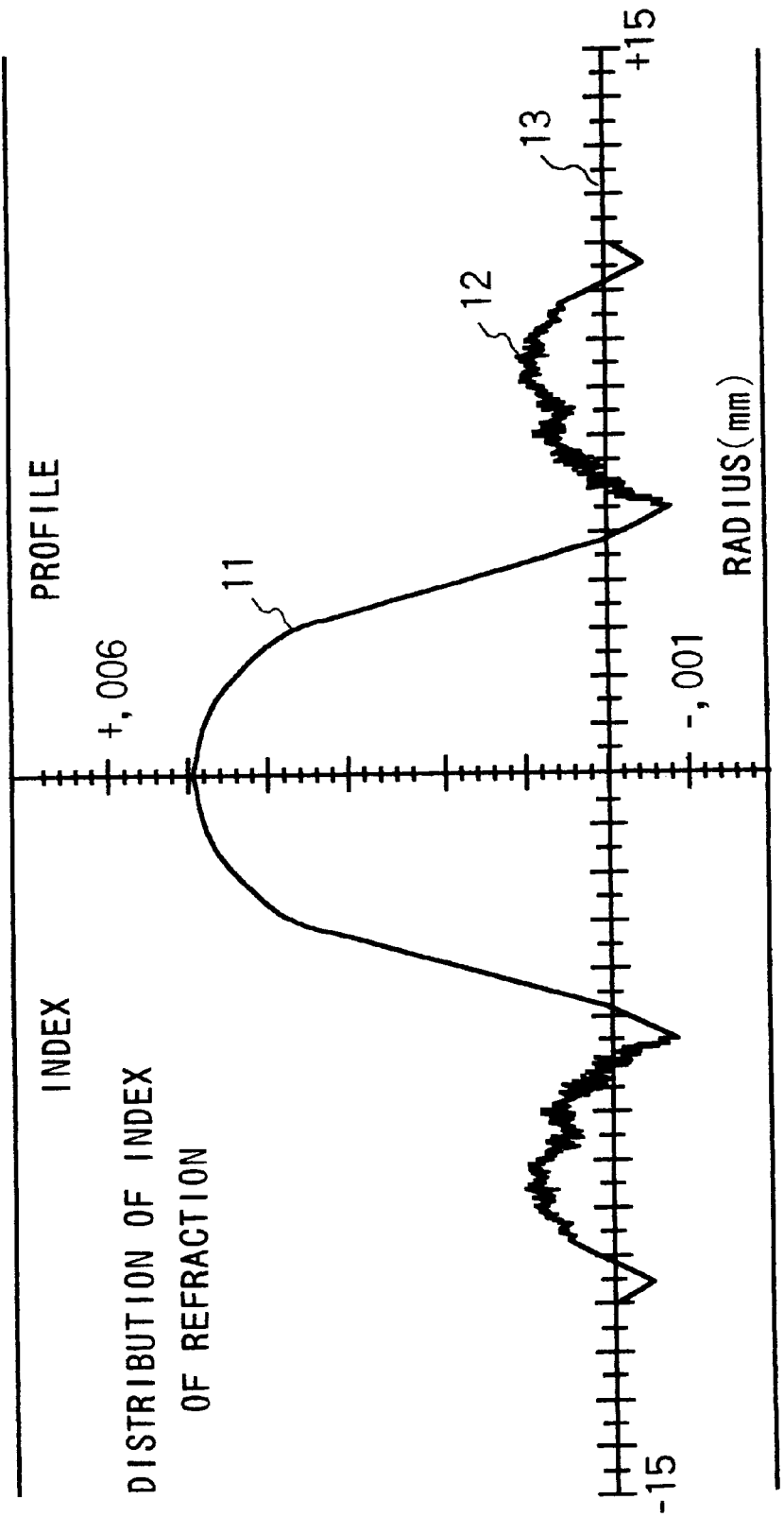
FIG. 8 illustrates the distribution of index of refraction of the optical fiber base material in the radial direction.

FIG. 8 shows an example of the distribution of the index of refraction in the radial direction of the optical fiber vase material 66. The bell-shaped curve 11 is the index of refraction of the core 61, the vibrating line 12 is the index of refraction of the first clad layer 62, and the index of refraction of the second clad layer 63 is indicated by the numerical reference 13. The difference between the indexes of refraction of the first and second clad layers 62 and 63 is smaller than the difference beween the indexes of refraction of the core 61 and the fist clad layer 62.

Figure 9:
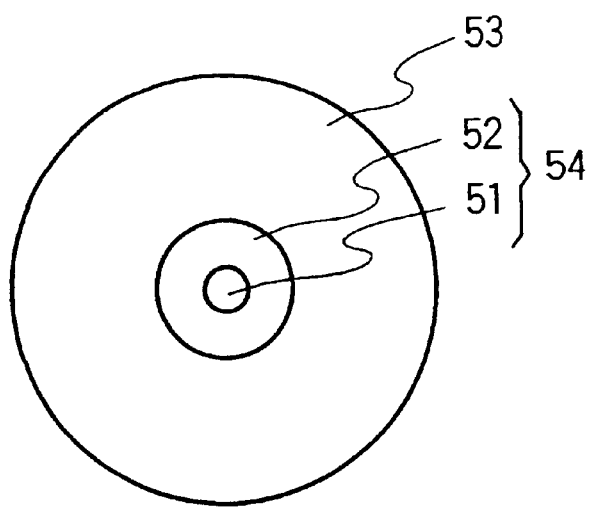
FIG. 9 is a radial cross-sectional view of the grating optical fiber according to the invention.

FIG. 9 is a cross-sectional view in the radial direction of the grating optical fiber manufactured through the processes shown in FIGS. 3 through 5. This grating optical fiber comprises a core 51, a first clad layer 52 surrounding the core 51, and a second clad layer 52 surrounding the first clad layer 51. A grating is provided to the core and the fist clad layer 52. The core 51 contains germanium, and the first clad layer 52 contains germanium and fluorine. Preferably, the ratio of the outer diameter of the core 51 to the outer diameter of the first clad layer 52 is about 1:2 to 1:6.

Figure 10:
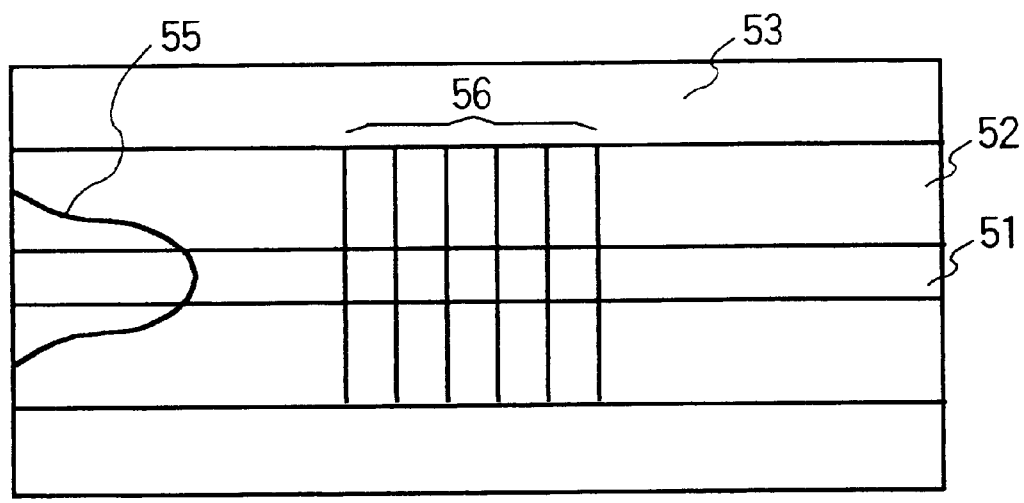
FIG. 10 is a cross-sectional view of the grating optical fiber of the invention, which is taken along the longitudinal axis, and shows the grating writing area and the light propagation range.

FIG. 10 is a cross-sectional view of the grating optical fiber shown in FIG. 9 taken along the longitudinal axis of the fiber. This figure shows the relation between the grating writing area and the light propagation range 55. Because the grating area is increased so as to cover both the core 51 and the first clad layer 52, the light propagation range lies within the grating area, and therefore, undesirable light leakage can be prevented. In particular, when the light propagates through the non-grating area, the light mainly propagates through the core with a little spread into the first clad layer 52. When the light propagates through the grating area, the light propagation path, including the spread, is inside the grating of the core 51 and the first clad layer 52, both of which have the filtering effect. In addition, because fluorine is doped in the first clad layer 52, the specific index of refraction of the first clad layer 52 is almost the same as that of the second clad layer 53.

Figure 11:
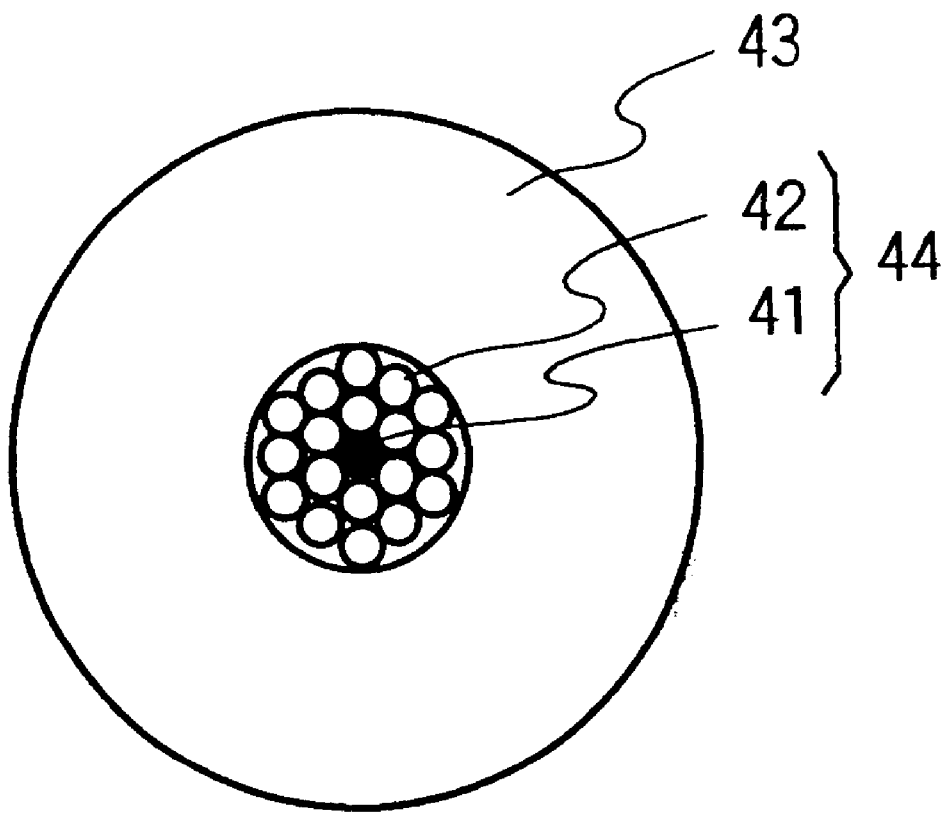
FIG. 11 is a radial cross-sectional view of the optical fiber base material suitable for grating according to another embodiment of the invention.

FIG. 11 is a cross-sectional view in the radial direction of the grating optical fiber according to another embodiment of the invention. In this embodiment, the core 41 is surrounded by a bundle of first clad sticks which form a first clad layer 42. The core 41 and the bundle of first clad sticks 42 are jacketed into a single unit to form a first clad base, which is then surrounded by the second clad layer 43.

Figure 12:
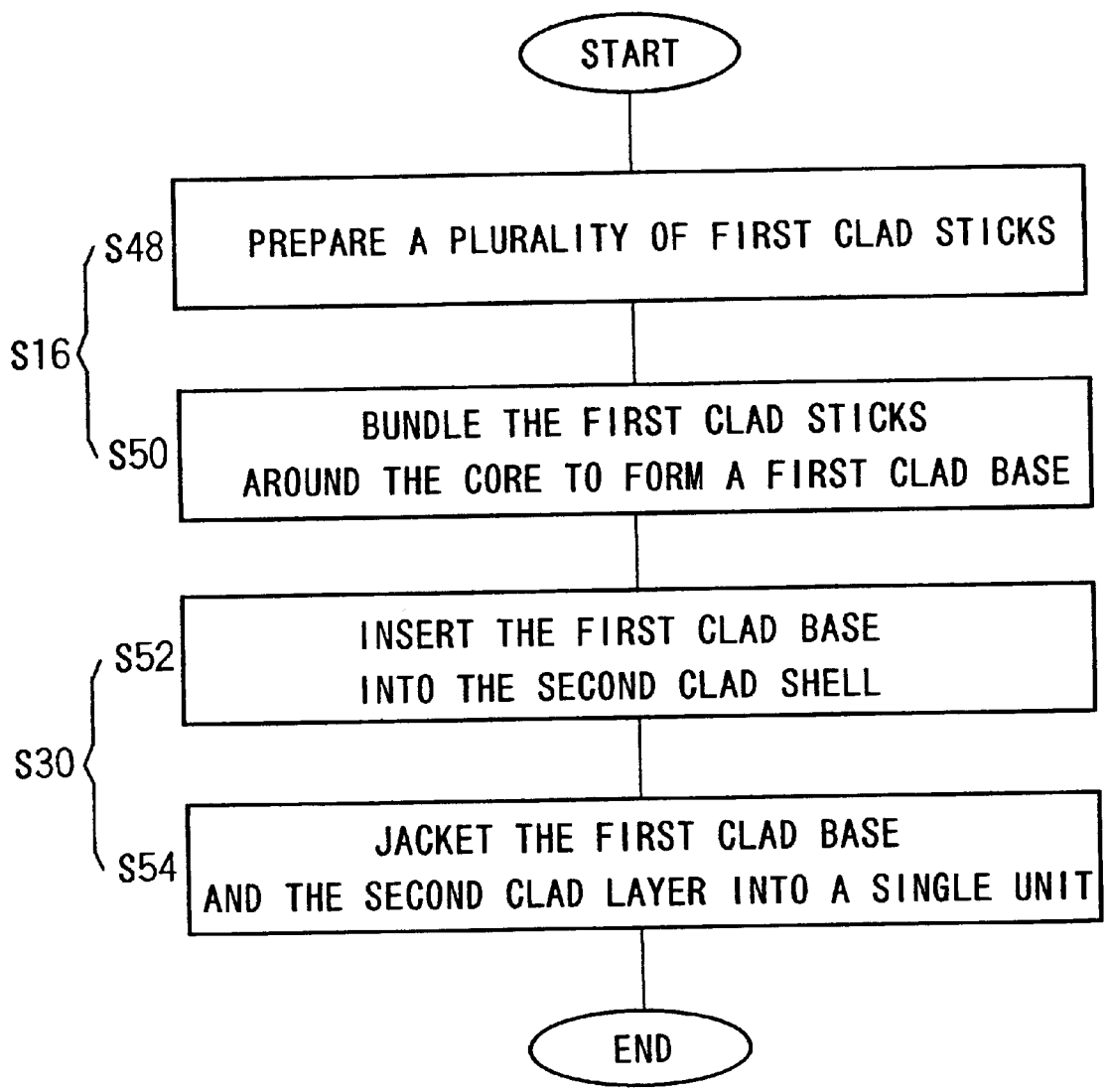
FIG. 12 is a flowchart of the manufacturing process of the grating optical fiber according to another embodiment of the invention.

FIG. 12 is a flowchart of the manufacturing process of the grating optical fiber shown in FIG. 11. First, a plurality of first clad sticks 42, in which germanium is doped, are prepared (S48). These first clad sticks 42 are bundled around the core 41 to form a first clad base 44 (S50). Steps S48 and S50 correspond to the step S16 in FIG. 3. In S52, he first clad base 44 is inserted in the second clad layer shell 43, which is manufactured in the same process as in the previous embodiment shown in FIG. 5. The second clad layer shell 43 and the first clad base 44 are jacketed together into a single unit (S54). Preferably, in the step of forming the first clad base 44 (S50), the maximum number of the first clad sticks that can be inserted in the second clad layer shell 43 is bundled around the core 41.

ACTUAL EXAMPLE 1

A core which is made of quartz containing germanium was made by a vapor-phase axial deposition method. The percentage difference between the specific indexes of refraction of the core and pure quartz was 0.4%. Then, silica soot, in which germanium is doped, was deposited on a quartz axis by an outside vapor deposition method. The amount of germanium doped in the silica soot was selected so as to be almost the same as that contained in the core. After the deposition, the quartz axis was removed from the silica soot layer. The silica soot layer was sintered in the fluorine atmosphere to form a first clad glass shell. Fluorine was supplied at a flow rate of 7.6 L/min. The average specific index of refraction of this glass shell with respect to pure quartz was almost zero over the entire glass shell. The first clad glass shell was etched and polished, and after that, the core was inserted in the polished glass shell. The first clad glass shell, which now surrounds the core, was heated by a burner to jacket them into one unit. The jacketed material was elongated by wiredrawing. The elongated material is inserted into another first clad glass shell, and the second jacketing was performed, whereby the first clad base was completed.

The first clad base was inserted into a tube-like quartz shell, which is the second clad layer. The quartz shell and the first clad base was jacketed into one unit under the same conditions as described above. Thus, the optical fiber base material was prepared.

The optical fiber base material was subjected to wire-drawing at 2000° C., and an optical fiber having an outer diameter of 125 μm was formed. If the outer diameters of the core and the first clad layer are R1 and R2, the ratio R1:R2 was 1:6 in this example. The optical fiber was irradiated by ultraviolet rays to write a grating on the core and the first clad layer. This grating area covers the light propagation range.

ACTUAL EXAMPLE 2

A core having a specific index of refraction difference with respect to pure quartz is 0.7% was formed in the similar manner as in Example 1. Silica soot in which germanium is doped was deposited on a quartz axis by a vapor-phase axial deposition method. The amount of germanium doped in the silica soot layer was selected so as to be the same as in the core. The silica soot layer was sintered in the fluorine atmosphere to form a first clad glass shell at a fluorine flow rate of 7.6 L/min. The first clad glass shell was wiredrawn, and a plurality of solid glass sticks (i.e., first clad sticks) with an outer diameter of 3 mm were formed. The specific index of refraction of the first clad sticks with respect to pure quartz was almost zero. Each of the first clad stick was etched and polished. Then, the core and these first clad sticks were inserted into a tube-like second clad shell so that the first clad sticks surround the center core at the maximum density inside the second clad shell, as shown in FIG. 11. The ratio R1:R2 was 1:6. The entire material was jacketed under the same conditions as in the first example, and an optical fiber base material was obtained.

The optical fiber base material was subjected to wire-drawing at 2000° C., and an optical fiber having an outer diameter of 125 μm was formed. The ratio R1:R2 was kept at 1:6. The optical fiber was irradiated by ultraviolet rays to write a grating on the core and the first clad layer. This grating area covers the light propagation range.

According to these examples, light leakage in the grating area is greatly reduced, and a light component of a specific wavelength can be efficiently extracted.

Although the invention has been described by way of exemplary embodiments, it should be understood that many changes and substitutions may be made by those skilled in the art without departing from the spirit and the scope of the invention which is defined only by the appended claims.

What is claimed is:

1. A method for manufacturing an optical fiber base material which is used as the base body of an optical fiber, the method comprising the steps of:

preparing a core in which germanium is doped;

forming a first clad layer, in which both germanium and fluorine are doped, around the core to produce a first clad base; and forming a second clad layer around the first clad base, wherein the first clad base is formed by a method comprising the steps of:

preparing a quartz axis;

depositing silica soot, in which germanium is doped, on the quartz axis to form a silica soot layer;

removing the quartz axis from the silica soot layer;

sintering the silica soot layer in the fluorine atmosphere to form a sintering glass shell;

etching and polishing the sintering glass shell to form a polished glass shell; and inserting the core into the polished glass shell.

2. The method according to claim 1, wherein the step of forming the second clad layer comprises the steps of:

preparing a quartz axis;

depositing silica soot on the quartz axis to form a second silica soot layer;

removing the quartz axis from the second silica soot layer;

sintering the second silica soot layer in the fluorine atmosphere to form a second sintering glass shell;

etching and polishing the second sintering glass shell to form a second polished glass shell; and inserting the first clad base into the second polished glass shell.

3. The method according to claim 1, wherein the step of forming the first clad base comprises the steps of:

preparing a plurality of first clad sticks in which germanium is doped; and bundling the plurality of first clad sticks so as to surround the core in order to form the first clad base, and wherein the steps of forming the second clad layer comprises the steps of:

forming a tube-like second clad layer shell; and inserting the first clad base into the second clad layer; and jacketing the first clad base and the second clad layer into a single unit.

4. The method according to claim 3, wherein the step of forming the first clad layer base includes the step of bundling the maximum number of the first clad sticks that can be inserted in the second clad layer shell, around the core.

5. A method for manufacturing an optical fiber base material which is used as the base body of an optical fiber, the method comprising the steps of:

preparing a core in which germanium is doped;

forming a first clad layer around said core to produce a first clad base, in which both germanium and fluorine are doped so that the difference between the specific index of refraction of said first clad layer and that of a second clad layer formed around said first clad layer becomes substantially zero; and forming said second clad layer around said first clad base, wherein the first clad base is formed by a method comprising the steps of:

preparing a quartz axis;

depositing silica soot, in which germanium is doped, on the quartz axis to form a silica soot layer;

removing the quartz axis from the silica soot layer;

sintering the silica soot layer in the fluorine atmosphere to form a sintering glass shell;

etching and polishing the sintering glass shell to form a polished glass shell; and inserting the core into the polished glass shell.

* * * * *